March 19, 1946.  E. W. PITMAN  2,396,748
PREHEATER FOR FATS
Filed Jan. 8, 1945   2 Sheets-Sheet 1

Inventor:
Eugene W. Pitman,
by Thomson & Thomson
Attorneys

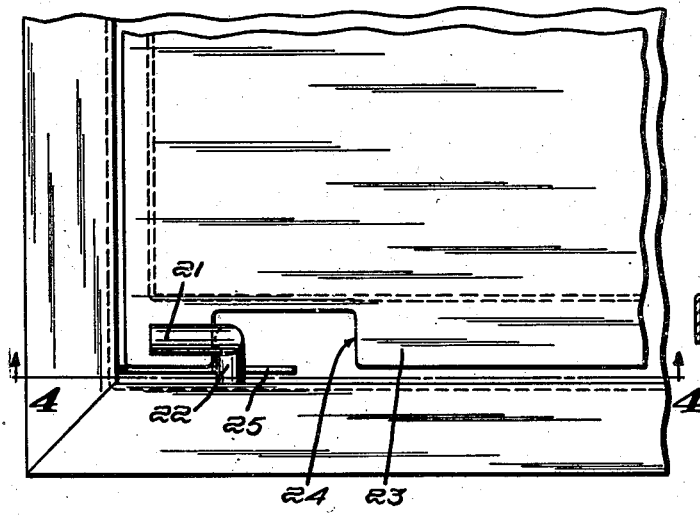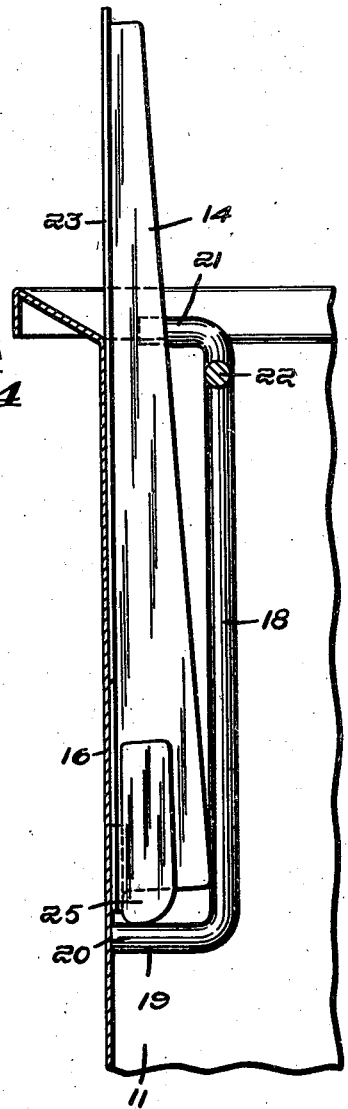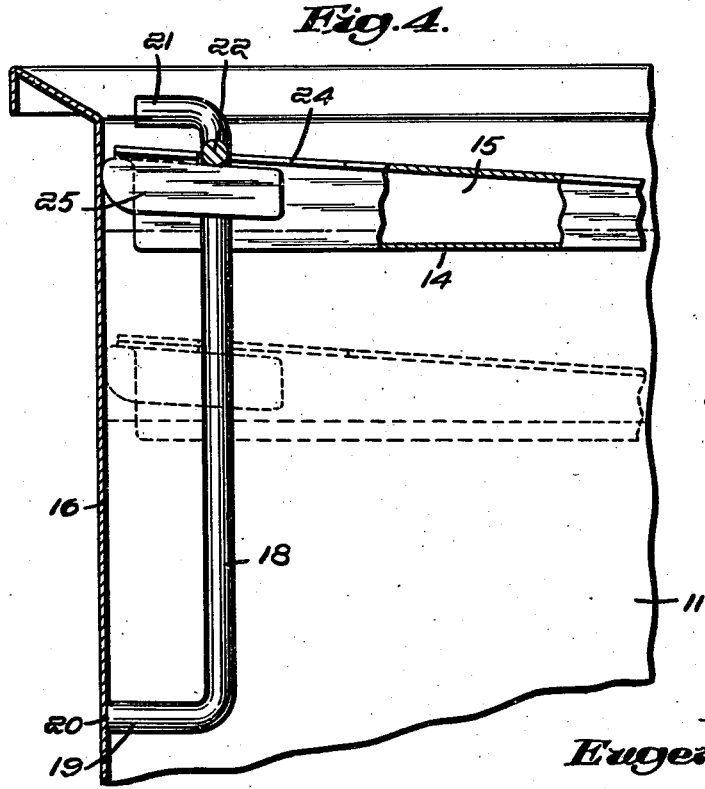

Patented Mar. 19, 1946

2,396,748

UNITED STATES PATENT OFFICE 2,396,748

PREHEATER FOR FATS

Eugene Wellington Pitman, Swampscott, Mass.

Application January 8, 1945, Serial No. 571,881

4 Claims. (Cl. 99—407)

This invention relates to preheaters for cooking fats, and pertains more particularly to improvements in fat melting tanks desirably employed to liquefy and preheat solid fats for subsequent use in frying apparatus designed to deep-fry doughnuts, potatoes and other foods.

Such preheating tanks are periodically charged with solid fats by shoveling large blocks of solidified fat into the hot liquid in the tank, with the result that the hot fat surges upwardly and frequently splashes over the top of the tank, thus subjecting workmen to the danger of serious burns.

It is accordingly the principal purpose of the present invention to obviate this danger by equipping the preheating kettle with tiltable floats which substantially cover the surface of the hot fat within the kettle and thus serve as effective splash guards and cause the solid fat temporarily supported thereon to slide gradually into the hot liquid, as the free opposed ends of the floats are submerged by the weight of the solid charge, upward movement of the outer ends of the floats being controlled and limited by guides.

A preferred embodiment of the invention is shown in the accompanying drawings, but it will be understood that the structural details of the apparatus herein illustrated and described may be varied without departing from the essence of this invention as defined in the appended claims. In the drawings, Fig. 1 is a plan view of a fat melting tank showing the floats in normal position;

Fig. 3 is an enlarged fragmentary detail of a corner of the tank as shown in Fig. 1;

Fig. 4 is an enlarged section, taken on line 4—4 of Fig. 3, with a part of the float broken away and showing in dotted lines an alternate position of the float; and Fig. 5 is a view similar to Fig. 4, illustrating the mode of removing or replacing one of the floats.

The melting tank 11 may be of any suitable size and construction and may be provided with any suitable heating devices, such as the tubes 12 which, as here shown, extend through the tank near its bottom 13. It may be supported upon suitable legs or standards and its bottom may have the usual drain valve, these common features being omitted from the illustrations of the apparatus.

Figure 1:
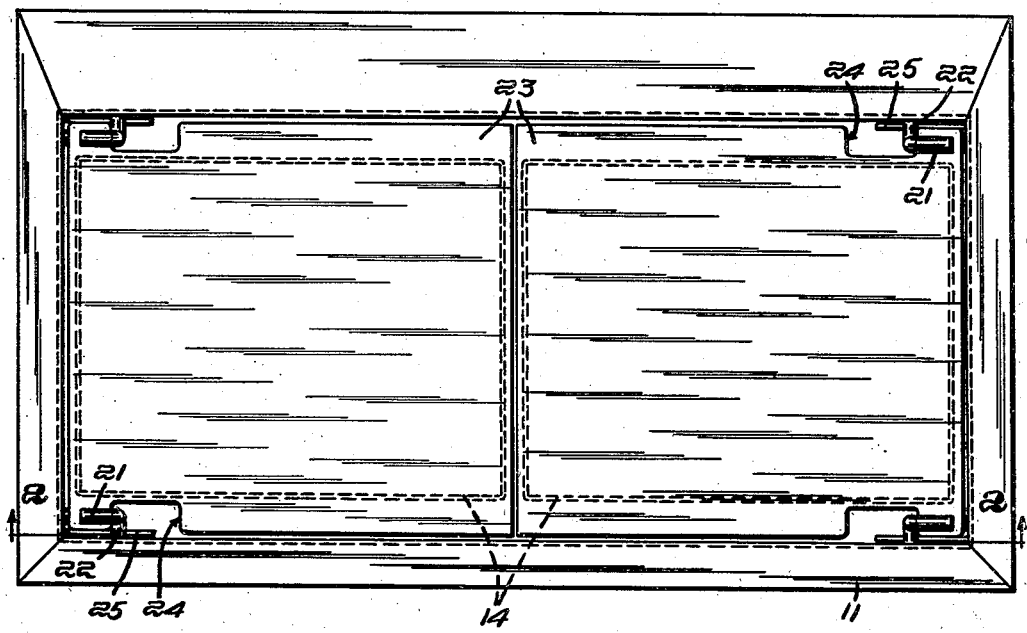
Figure 2:
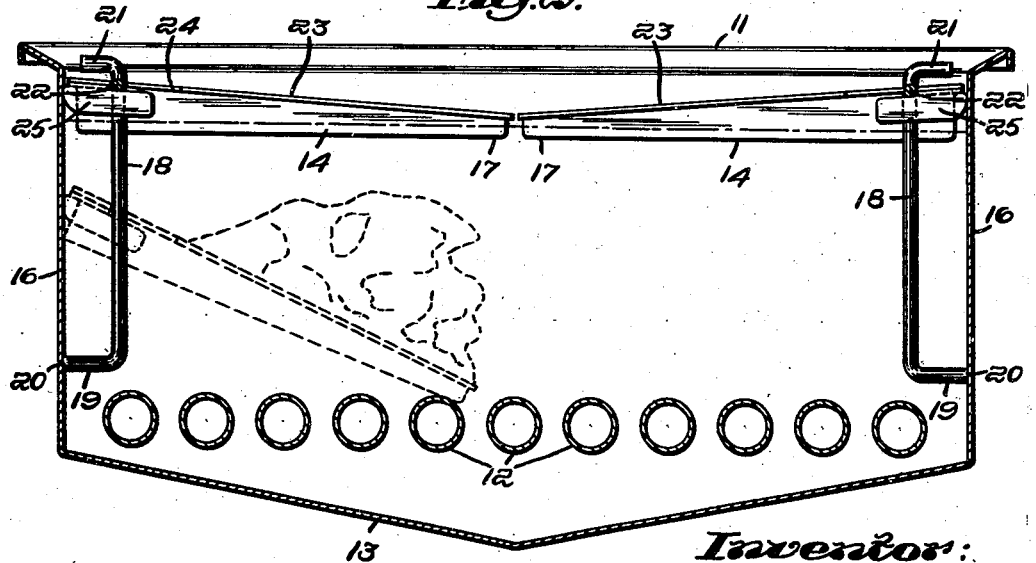
Fig. 2 is a sectional view taken on line 2—2 of Fig. 1 and illustrating in dotted lines a tilted position of one of the floats.

In accordance with this invention, the tank is equipped with a pair of floats 14, preferably identical to each other and of such size and shape as substantially to cover the surface of the liquid within the tank, when the opposed floats are freely supported in horizontal position as shown in Figs. 1 and 2. The floats may be made of any suitable material, such as solid cork or wood, but preferably consist of metal shells having air chambers 15 as shown in Fig. 4 to afford greater buoyancy and durability than wooden floats.

Each float is independently mounted at an end wall 16 of the tank, so that it may rise and fall in horizontal position to follow the level of the melted fat, and so that its inner end 17 may tilt downwardly and be submerged by the weight of solid fat dumped into the center of the tank, as indicated by the dotted line position of Fig. 2. The outer end of each float is guided by a sliding hinge arrangement which permits free vertical movement of the horizontal float but limits upward movement of the outer end thereof when its free inner end is thus depressed.

For this purpose, the respective tank ends 16 are preferably provided with guide rails 18 adjacent each side thereof, each rail consisting of a rod having its lower end 19 bent outwardly and welded or otherwise rigidly attached to the wall 16, as at 20, and its upper end 21 also bent outwardly but terminating short of the tank wall. The guide rails are thus supported in vertical position, parallel to the walls 16 and spaced from said walls at their upper ends. Said upper ends are braced by short cross bars 22 welded thereto and to the tank sides; and the rods 22 also serve as stops limiting upward movement of the outer ends of the respective floats as hereinafter explained.

The sides of each float preferably have projecting flanges or aprons 23 formed with wide notches or recesses 24 in which the guide rails 18 are received; and the outer ends of said aprons are provided with flat metal fingers or hooks 25 which extend inwardly between the rails 18 and the side walls of the tank at each corner thereof. These hooks engage the cross bars 22 when the floats are elevated to the position shown in full lines in Figs. 2 and 4, thereby limiting the upward movement of the outer ends of the floats and preventing the floats from upending when their inner ends are depressed by the weight of solid fat deposited thereon.

When thus mounted for limited sliding and tilting movement relative to the tank ends, the floats follow the level of the melted fat within the tank, and their free ends 17 are tilted downwardly into the liquid when a charge of solid fat is dumped thereon, so that the cold fat is submerged and gradually melted until it liquifies and permits the floats to resume their normal horizontal position on the surface of the hot liquid where, as will be evident, they substantially cover the surface and effectively prevent splashing of the hot liquid when the tank is charged with a new supply of cold fat.

Either of the floats may be removed to permit cleaning of the tank or for other purposes by raising its free end to the position shown in Fig. 5, and then lifting the float vertically so that the aprons 23 pass between the end wall 16 and the stub ends 21 of the guide rails 18, and the hooks or fingers 25 pass between said end walls and the cross bars 22. Obviously, the floats may be replaced by reversing the movement.

I claim:

1. In a fat melting tank of the character described, a pair of floats serving as splash guards and together adapted to cover a substantial area of the surface of melted fat within the tank, said floats having opposed, freely movable inner ends, and cooperating means on the outer ends of the respective floats and on the ends of the tank for guiding vertical movement of the floats and limiting upward movement of their outer ends, whereby the inner ends thereof are depressed and submerged by the weight of solid fat deposited thereon.

2. In a fat melting tank of the character described, a pair of floats serving as splash guards and together adapted to cover substantially the surface of melted fat within the tank, said floats having opposed, freely movable inner ends, guides attached within the tank adjacent and parallel to the respective ends thereof, and cooperating means on said guides and on the outer ends of said floats permitting vertical and angular movement of the floats and limiting upward movement of said outer ends, whereby the inner ends of the floats are depressed and submerged by the weight of said fat deposited thereon.

3. In a fat melting tank of the character described, a pair of floats serving as splash guards and disposed in end-to-end relation to substantially cover the surface of melted fat within the tank, vertical guide rods mounted inside the end walls of the tank in spaced parallel relation thereto, the upper ends of said rods extending toward the respective end walls but terminating short thereof, cross bars connecting the upper portions of said rods to the tank sides adjacent thereto, the outer end of each float having means cooperating with the guide bars to control vertical movement of the float, said means engaging said cross bars when the outer end of the float is raised and limiting upward movement thereof.

4. In a fat melting tank of the character described, a pair of floats serving as splash guards and disposed in end-to-end relation to substantially cover the surface of melted fat within the tank, vertical guide rods mounted inside the end walls of the tank in spaced parallel relation thereto, the upper ends of said rods extending toward the respective end walls but terminating short thereof, cross bars connecting the upper portions of said rods to the tank sides adjacent thereto, the outer end of each float having inwardly projecting side fingers hooked around the guide bars for controlling vertical movement of the float and adapted to engage said cross bars to limit upward movement of said outer end when the free inner end thereof is depressed and submerged by depositing solid fat thereon.

EUGENE WELLINGTON PITMAN.